July 11, 1967  W. V. SHEARER ET AL  3,330,555

PNEUMATIC SHEET FEEDING PLATEN AND SUPPLY MAGAZINE

Original Filed April 24, 1962  6 Sheets-Sheet 1

INVENTORS
WALTER V. SHEARER
WILLIAM R. BECK, JR.
BY ARNOLD M. WHEELOCK, SR.

Cleveland B. Hollabaugh
ATTORNEY $$\text{3,330,555}$$
Patented July 11, 1967

1

3,330,555
PNEUMATIC SHEET FEEDING PLATEN AND SUPPLY MAGAZINE
Walter V. Shearer, Longmeadow, William R. Beck, Jr., Wilbraham, and Arnold M. Wheelock, Sr., Southwick, Mass., assignors to The Plastic Coating Corporation
Original application Apr. 24, 1962, Ser. No. 189,758, now Patent No. 3,180,239, dated Apr. 27, 1965. Divided and this application Dec. 23, 1964, Ser. No. 420,721
11 Claims. (Cl. 271—30)

This application is a division of our copending application Ser. No. 189,758, filed Apr. 24, 1962, and now U.S. Patent No. 3,180,239.

This invention relates to pneumatic sheet feeding apparatus, and more particularly to apparatus which is adapted to form a component part of the apparatus for the reproduction of copy. This apparatus has been developed for use in equipment for the photoelectrostatic reproduction of copy. However, it is also well adapted for use in equipment adapted for the reproduction of copies by other methods.

The apparatus in accordance with this invention comprises in combination a vacuum platen, a means for moving the vacuum platen in a horizontal plane and a copy sheet supply magazine which is adapted to deliver a sheet of copy paper to the lower surface of the vacuum platen, while the vacuum platen is in its initial position of rest. The transport means associated with the vacuum platen rotates the vacuum platen through an angle of ninety degree to place its lower surface in a vertical plane, facing away from the transport means, thereby placing a sheet carried on the lower surface in a vertical optical image plane of the reproduction apparatus.

The vacuum platen pauses to retain a copy sheet in the vertical optical image plane for a predetermined interval of time to permit the exposure of the surface of the copy sheet to an optical image. After this pause, the vacuum platen is returned to a position approximating its original position, but laterally displaced therefrom by a short distance which places the edge of the copy sheet which it carries to be picked up by a conveyor to be carried through a series of processing steps to develop the image carried by its surfaces.

When in use in reproduction equipment, the copy supply magazine, the vacuum platen and its transport mechanism are enclosed in a light-tight compartment which protects the copy sheet from all light other than that of the optical image to which the sheets are exposed when in the vertical optical image plane.

In the use of this apparatus, the magazine is loaded with a stack of copy sheets with the side of each sheet which is to receive an image facing downwardly and after being picked up by the vacuum platen is carried with that side facing downwardly. When the vacuum platen pauses after placing the sheet in the vertical optical image plane, the side of the sheet which is to receive an image faces outwardly away from the platen.

In apparatus which reproduces copy by a photoelectrostatic process, an electrical corona discharge unit is located below and at right angles to the line of horizontal travel of the vacuum platen in a position between the copy supply magazine and the position in which the vacuum platen begins its rotation. The corona discharge unit is adapted to direct a corona discharge upwardly as the copy sheet passes above it. This imposition of an electrostatic charge on the photoelectrostatic coating of the copy sheet renders it sensitive to light and capable of receiving a latent electrostatic image when exposed to an optical image in the vertical optical image plane.

The magazine in which a supply of copy sheets is maintained during the operation of this apparatus consists of a horizontal plate provided with brackets to keep the edges of a stack of the sheets in vertical alignment which is, in effect, an open-top tray, and a mechanism which is adapted to raise the plate to bring the top sheet of the stack into contact with the vacuum platen of the apparatus, when the platen is in its initial position, and then lower the plate to its own initial position. The bracket on this horizontal tray adjacent the end of the conveyor system of the apparatus, is made of an electrically-insulated material to avoid the possibility of a short-circuit when a photoelectrostatic sheet is removed from the vacuum platen by the conveyor system.

As noted above, the copy sheets are placed in this magazine with the coating which is to receive a copy facing downwardly. The mechanism for raising and lowering the magazine consists of a pair of toggle arms on each side of the plate, one of which is connected to the piston of an air cylinder which is supplied with compressed air from the pressure side of a vacuum pump, the vacuum side of which is connected to the vacuum platen. The air pressure raises the magazine until it is stopped by the top of the stack of sheets it carries and comes into forceful contact with the vacuum platen. The upwardly movement of the magazine is automatically timed by an automatic electrical control system by the operation of a solenoid valve in the compressed air line. An automatic electrical control system which is well adapted for the operation of this apparatus is disclosed by our copending U.S. patent application Ser. No. 189,758, filed Apr. 24, 1962, now U.S. Patent No. 3,180,239.

At the time that the upwardly movement of the magazine is started, vacuum is applied to the vacuum platen by a tube from the vacuum pump to the platen. The vacuum platen picks the top sheet from the magazine. This establishes a vacuum in the vacuum line, due to the sheet sealing the vacuum platen. The solenoid valve is then signaled by a pressure-sensitive switch in the vacuum line that a sheet has been picked up and the solenoid then releases the pressure to the magazine air cylinder, permitting the magazine to drop under its own weight to its initial position of rest.

The use of compressed air for raising the magazine is an advantageous feature of this apparatus, since it automatically compensates for the progressive reduction in the height of the stack of photoelectrostatic sheets carried by the magazine as the sheets are successively removed therefrom by the action of the vacuum platen, and for the sudden increase in the height of the stack when the magazine is restocked with a supply of the photoelectrostatic sheets. Further, it eliminates the need for a hand toggle manipulated by the operator and, hence, is fully automatic in its operation.

The dual use of the vacuum pump of this apparatus to provide the vacuum required for the operation of the vacuum platen, and the compressed air required for the operation of the compressed air cylinder of the magazine is also an advantageous feature of this apparatus in that it simplifies the apparatus by eliminating the necessity of two separate pumps, one a vacuum pump and the other a compressed air pump.

This copy supply magazine and the vacuum platen provide an advantageous feature of this apparatus arising from the fact that the magazine must deliver a sheet to the vacuum platen, which effectively seals the vacuum platen, before the vacuum platen can proceed with its cycle of operation. When the supply of sheets in the magazine is exhausted and no vacuum is produced in the vacuum platen, the solenoid switch does not receive the signal which is pre-requisite to the movement of the vacuum platen by its transport system, as described hereinafter. Furthermore, the suction of air through the orifices in the face of the vacuum platen creates an audible sound, which informs the operator of the apparatus as to the reason for the failure of the apparatus to automatically continue its sequence of operations.

The horizontal plate of this magazine which carries the stack of copy sheets can be withdrawn from its light-tight enclosure on carrier rails, into a position at which the supply of copy sheets thereon can be conveniently replenished. This carrier plate must be returned to its operating position and accurately repositioned therein, before the electrical system can start the automatic cycle of the operations of the apparatus. This provision for the convenient replenishment of the supply of copy sheets is an advantageous, time-saving feature of the apparatus.

The vacuum platen of this apparatus is smaller in at least one dimension than the photoelectrostatic copy sheets with which it is used. It may, for example, be approximately two inches smaller in each dimension of its surface than the sheet which the apparatus is designed to utilize. In its initial position, it is centered over the position to which the sheet magazine is raised to permit the platen to pick up a sheet of copy paper, so that the edges of the sheet on the platen extend beyond the edges of the platen the same distance along at last two opposite edges.

This feature of the apparatus is important in the operation of the apparatus at two different points. It permits the sides of the magazine to clear the edges of the platen as it is raised to permit the platen to pick up a copy sheet. Further, as will be described hereinafter in detail, it permits the conveyor system to pick the sheet off for the sequence of process steps necessary to develop the image on its surface. Further, it allows the stack to be mechanically riffled as the magazine drops away from the platen, thus insuring a single sheet pick-up. Stated in another way, it permits the mechanical riffling of the edge of the stack to avoid a multiple pick-up of sheets by the platen, which can otherwise occur due to an accumulation of static electricity in the stack which causes the sheets to cling together.

The vacuum platen is attached by a flexible hose to the vacuum side of a vacuum pump, and is mounted on a shaft which is carried by journals attached to a carrier plate which forms a part of the transport mechanism. The shaft on which the platen is mounted can both rotate and slide laterally in these journals. One end of this shaft carries a gear, and the other end is loaded by a spring which has its tension directed to retain the platen in its normal position with respect to the carrier plate.

The carrier plate is carried on one side by journals on a horizontal carrier rod, which permits the carriage to be slid from its initial position over the magazine to a position in which the platen is rotated to place the surface of the copy sheet in the image plane of the apparatus, while accurately maintaining the predetermined line of travel of the carrier plate. The other side of the carrier plate is carried by a roller, which travels along the upper surface of a second horizontal carrier rod which parallels the first rod. Alternatively, this carrier plate may be carried by a pair of journals on each side which are, respectively, mounted to slide on parallel rods.

Two sprockets, carrying a sprocket chain which is preferably of the roller type, are located above the line of travel of the platen carriage. These sprockets are spaced apart along a line parallel to the horizontal carrier rods a distance determined by the length of the travel of the carrier plate. One of the sprockets is driven through a reduction gear by an electric motor, while the other sprocket is merely an idler. A cross-slide carrying a pawl is located on the top of the carriage. The pawl is attached to the sprocket chain and, as the chain moves, causes the carriage to slide along its carrier rods in reciprocating travel, while the pawl slides laterally back-and-forth in its slide.

The ends of the horizontal carrier rods near the image plane of the apparatus are held by a plate which also carries a short rack, located to engage the gear at the end of the shaft which carries the vacuum platen. When this gear engages this rack, as the vacuum platen is moved toward the optical image plane of the apparatus, the vacuum platen is rotated through a ninety-degree angle to position the surface of a sheet which it carries in the vertical optical image plane.

This vacuum plate transport mechanism is provided with a second electric motor which operates a cam which is in contact with one end of a shift arm, which is pivoted and spring-loaded at its opposite end to keep it bearing on the cam. The cam is timed to move the free end of the shift arm outwardly at an angle to the direction of travel of the platen carriage, as the platen carriage is returned to its position over the magazine. The vacuum platen is provided, on its upper surface, with a shift roller which engages the shift arm as the platen nears its position over the magazine, and forces the platen to move laterally against the tension of the spring around the shaft which carries the platen. This places the platen in a laterally-displaced position in which a gripper, carried by the conveyor system of the apparatus, can grasp the edge of a sheet carried by the platen. At the instant that the gripper grasps the sheet, the vacuum on the vacuum platen is relieved by the action of the electrical system of the apparatus and the cam and its associated shift arm permit the platen to return to its normal position over the magazine by the action of the spring around its shaft.

The apparatus in accordance with this invention has been described and some of its advantageous features pointed out in the foregoing. A specific embodiment of this apparatus will be described with reference to the accompanying drawings in which like reference characters are used to refer to like parts wherever they may occur.

Figure 5:
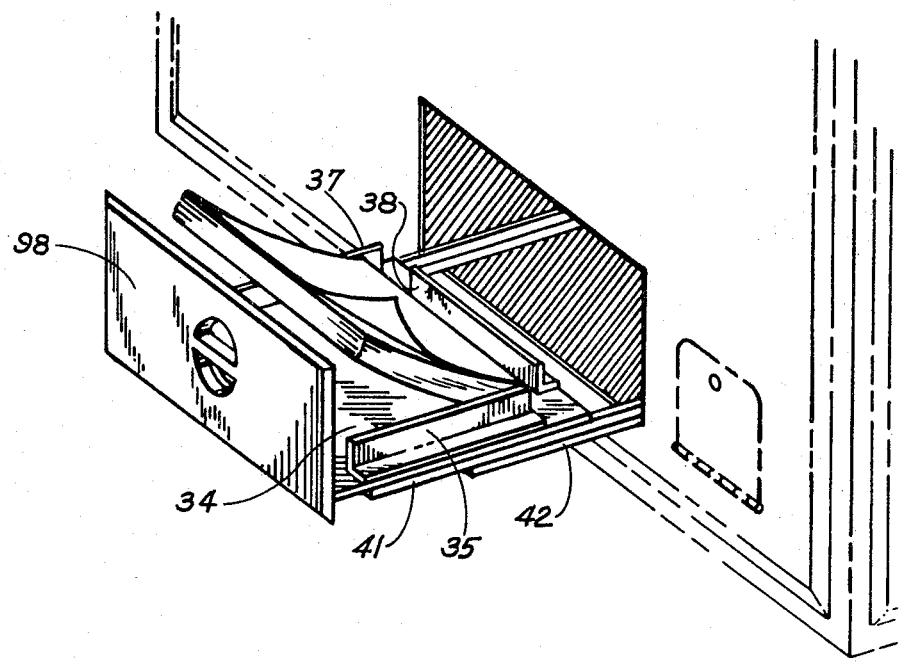
FIGURE 5 is a fragmentary, perspective view, showing the copy-carrier plate of the copy-supply magazine pulled out of the light-tight enclosure or cabinet in which this apparatus is located.

The copy-supply magazine of this apparatus is desirably located directly adjacent an opening in a vertical wall in the light-tight enclosure or cabinet in which this apparatus is housed, with a closure by which the opening can be rendered light tight. As illustrated by FIGURE 5, this closure may be in the form of a panel 98 attached to the outer end of the telescoping rails 42, 42. The telescoping rails 42, 42 permit the copy sheet carrier plate 34 with its guide walls 35, 36, 37 and 38 to be pulled out of the cabinet in which the apparatus is located, as shown by FIGURE 5, to permit a stack of copy sheets to be placed on the carrier plate 34. As already noted hereinbefore, when the carrier plate 34 is moved outwardly from its normal operating position to a position such as that illustrated by FIGURE 5, the limit switch 48 opens, preventing the copy-supply magazine from operating.

Figure 1:
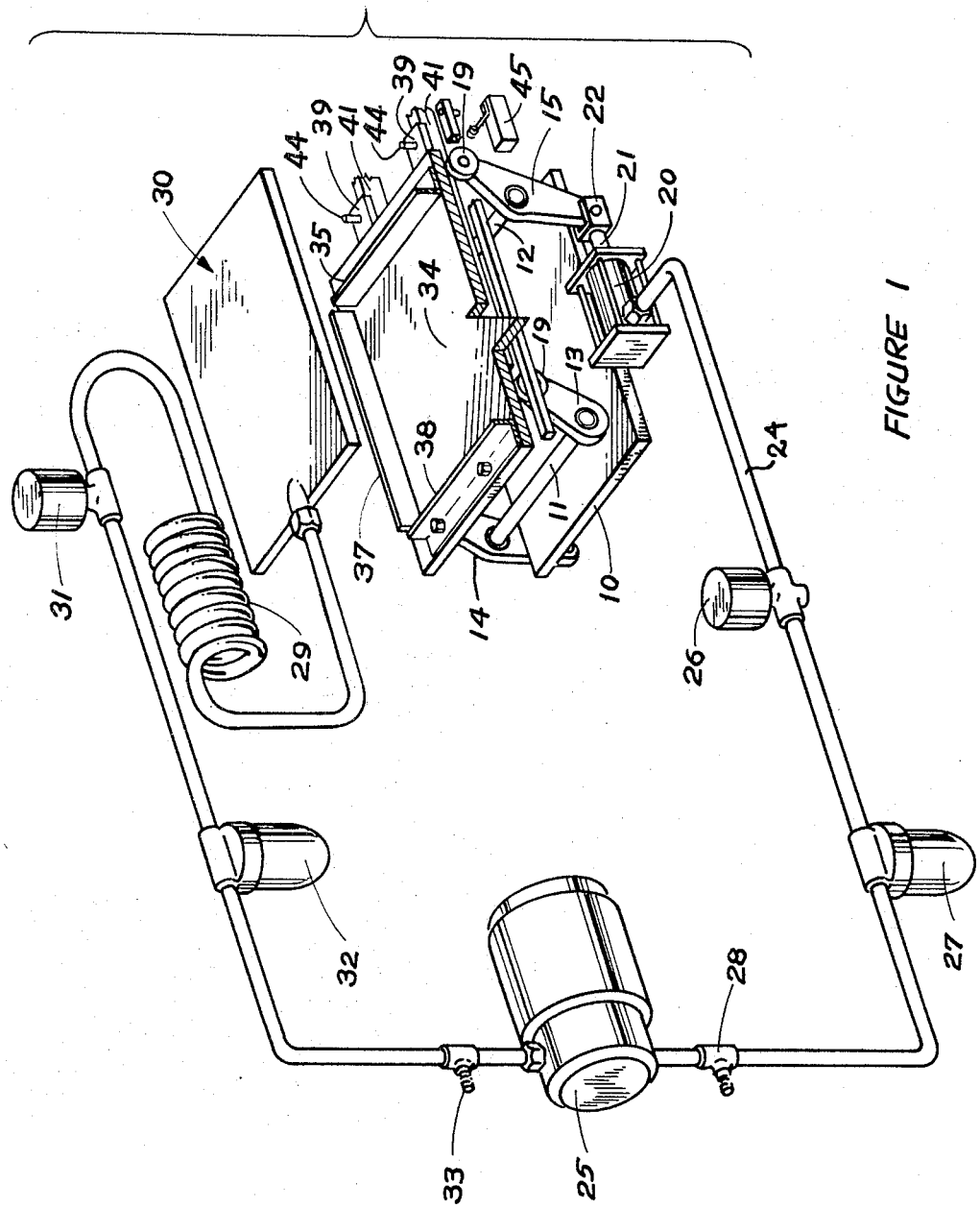
FIGURE 1 is a schematic, exploded, perspective view of the magazine for the supply of copy sheets of this apparatus, of its vacuum platen and of the vacuum and air pressure supply associated therewith.
Figure 2:
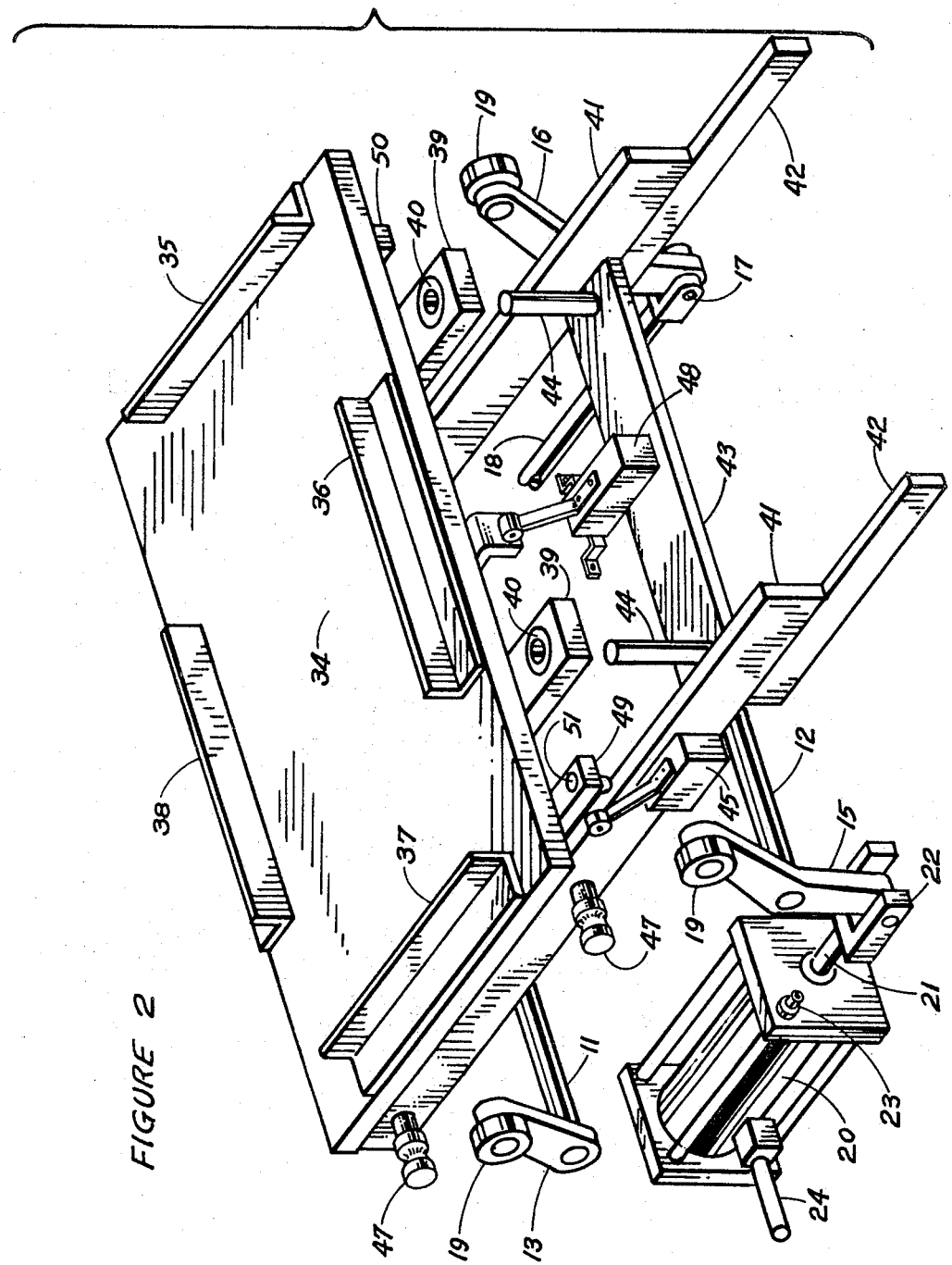
FIGURE 2 is a second exploded, perspective view of the magazine for the supply of copy sheets illustrated by FIGURE 1.

FIGURE 1 illustrates the copy sheet supply magazine of this apparatus and its air pressure supply, from the pressure side of the vacuum pump, which provides the vacuum for the operation of the vacuum platen of the apparatus. Referring specifically to that figure, it will be seen that this copy sheet supply magazine is provided with a base plate 10 which carries two pairs of journals, not shown by the drawing, which carry the axles 11 and 12. The axle 11 carries toggle arms 13 and 14 attached to its ends, while axle 12 carries the toggle arms 15 and 16 attached to its ends. The lower ends of toggle arms 14 and 16 are connected through swivel joints 17, 17 to the rod 18. The swivel joints 17, 17 and the rod 18 are shown by FIGURE 2. The upper ends of the toggle arms 13, 14, 15 and 16 each carry a roller 19.

The base plate 10 has the air cylinder 20 attached to its edge. The piston rod 21 of the air cylinder 20 is attached to the lower end of the toggle arms 15 by a swivel 22. As air under pressure is supplied to the air cylinder 20, forcing its piston rod 21 outwardly, the top of the toggle arm 15 moves in the reverse direction and on an upwardly-curved path, due to the angulation of the toggle arm. The rigid attachment of the toggle arms 14 and 16 to the ends of the axle 12, the linkage of the lower ends of the toggle arms 16 and 14 and the connecting rod 18, and the rigid attachment of the toggle arms 14 and 13 to the ends of the axle 11 causes the upper ends of the toggle arms 13, 14, 15, and 16 and the rollers 19, 19, which they carry, to move in synchronism as the lower end of the toggle arm is moved by the air cylinder 20. The atmospheric-pressure side of the air cylinder 20 is provided with a throttling valve 23, by which the rate of the exhaust and intake of air on that side of the cylinder can be regulated.

Still referring to FIGURE 1, the air cylinder 20 is connected to and supplied with air through a tube 24 which is connected to the pressure side of the vacuum pump 25. The tube 24 is provided with a solenoid valve 26 which, when opened, permits the air to be exhausted from the tube 24. The tube 24 is also provided with a filter 27 and a pressure relief valve 28 to insure against excessive pressure build-up in the tube 24 and the air cylinder 20.

The vacuum side of the pump 25 is connected through the flexible tube 29 to the vacuum platen 30 of the apparatus, which is shown schematically. The tube 29 is provided with a pressure-sensitive solenoid switch 31 which, in open position, permits the pump 25 to draw air from the vacuum platen 30. The tube 29 is also provided with a filter 32 and a pressure-relief valve 33.

The four rollers 19, 19 on the upper ends of the toggle arms 13, 14, 15 and 16 carry the copy sheet carrier plate 34 of the copy sheet magazine. The carrier plate 34 has four guide walls 35, 36, 37 and 38. The guide wall 37 is made of an insulating material such as, for example, a phenol-formaldehyde plastic.

As best shown by FIGURE 2, the parallel bars 39, 39 extend forwardly from the bottom of one side of the carrier plate 34. These bars each carry a perforation 40, 40. The outer sections 41, 41 of the telescoping rails 42, 42 have the cross-bar 43 extending across between them and attaching them together. The cross-bar 43 carries the two vertical pins 44, 44 which are positioned to extend upwardly through the perforations 40, 40 with a sliding fit. One of the rails 41, 41 carries a limit switch 45 which is held in closed position when the carrier plate 34 is resting on the rollers 19, 19 in its initial position of rest.

Each of the telescoping rails 42, 42 consists of, in addition to the rails 41, 41, a pair of telescoping rails of the type frequently used to carry the drawers of office filing cabinets. These pairs of rails are provided with rollers which enable them to telescope smoothly. The innermost rail of each pair is attached to the frame of the cabinet 46 in which the apparatus is enclosed. The rails 41, 41 are each provided with a pair of rollers 47, 47, which enable the rails 41, 41 to be extended with respect to the movable rail of the innermost pair of telescoping rails.

The limit switch 48 is attached to the frame of the apparatus in a position such that is closed when the rails 42, 42 are fully telescoped, and the carrier plate 34 is in its operating position with respect to the rollers 19, 19 and the vacuum platen 30. When the plate 34 is moved outwardly from its normal operating position, this limit switch 48 opens. The copy supply magazine cannot operate when this limit switch 48 is open.

The bottom of the carrier plate 34 is provided with a second set of parallel bars 49, 50. These bars are positioned directly adjacent to the outer sections 41, 41 of the telescoping rails 42, 42 and insure that the carrier plate is in exact lateral alignment after being raised by the rollers 19, 19. The pins 44, 44 cooperate with the bars 49, 50 in this function.

The bar 49 carries an adjustable screw 51, which acts as the physical contact point which activates the limit switch 45. This screw provides a convenient adjustment to assure the proper functioning of the limit switch 45.

When in their fully-telescoped position, the rails 42, 42 position the carrier plate 34 in its operating position under the vacuum platen 30 are supported by the rollers 19, 19 and keep the limit switch 48 closed so that it is ready for operation by the electrical system of the apparatus to supply a copy sheet to the vacuum platen 30. When the carrier plate 34 is raised by the action of the air cylinder 20, upon activation by the electrical system of the apparatus, to deliver a copy sheet to the vacuum platen 30, its upwardly movement is guided by the pins 44, 44. Further, the pins 44, 44 guide the carrier plate 34 as the drawer 52, illustrated by FIGURE 5, is opened to form the bottom of that drawer.

The vacuum platen 30 is provided with a plurality of orifices in its lower surface which are located near each of its edges, not shown by the drawings, which extend to an internal air space in the platen, which is connected through tube 29 to the vacuum side of the vacuum pump 25, FIGURE 1. At the beginning of a cycle in which a copy is made by the apparatus, vacuum is supplied to the vacuum platen 30 by the opening of the solenoid valve 26. This vacuum retains the upper sheet of a stack of sheets on the lower surface of the vacuum platen 30, when the sheet is raised into contact therewith by the action of the copy sheet supply magazine.

The use of air pressure to raise the carrier plate 34 is advantageous in providing an automatic compensation for the variation in the height of a stack of copy sheets which it carries. The upward movement of the plate is automatically stopped by the forceful contact of the upper sheet of the stack of sheets with the vacuum platen 30. The pressure which is exerted upon such contact is determined by the air pressure in the cylinder 20, rather than by the distance that the plate 34 has been raised.

The carrier plate 34 returns under its own weight and the weight of the stack of copy sheets which it carries, when the air pressure within the cylinder 20 is released by the action of the solenoid valve 26. The rapidity with which the carrier plate drops back to its position of rest is determined by the adjustment of the throttling valve 23 on the atmospheric side of the piston of the cylinder 20. As already noted, upon returning to its position of rest, the carrier plate 34 activates the limit switch 45. The tripping of this limit switch starts the operation of the transport mechanism of the apparatus to move the vacuum platen 30 through the successive positions in which it carries a copy sheet into the optical plane of the apparatus to expose it to an optical image to produce a latent image on its surface, returns it to a position in which the sheet is picked up by the conveyor system of the apparatus and, finally, returns it to its initial position in which it is ready to repeat the cycle. This transport mechanism and the detailed construction of a preferred embodiment of the vacuum platen 30 will be described hereinafter with reference to FIGURE 3.

In the event that the supply of copy sheets on the carrier plate 34 is exhausted or, for some other reason, the vacuum platen does not pick up a copy sheet from the carrier plate 34, no vacuum is developed in the vacuum line 29. This failure to develop a vacuum in the line 29 leaves the pressure-sensitive switch 31 in its open position. This switch 31 must be closed to permit the apparatus to proceed to the next step of its automatic cycle, i.e. the movement of the vacuum platen by its transport mechanism, etc. Therefore, the automatic cycle of the apparatus is stopped. The vacuum pump 25 continues to operate, sucking air through the orifices in the lower surface of the vacuum platen 30. The passage of air into these orifices creates an audible whistling sound which informs the operator as to the cause of the failure of the apparatus to proceed with its automatic cycle, and advises him that the supply of copy sheets on the plate 34 must be replenished.

Figure 3:
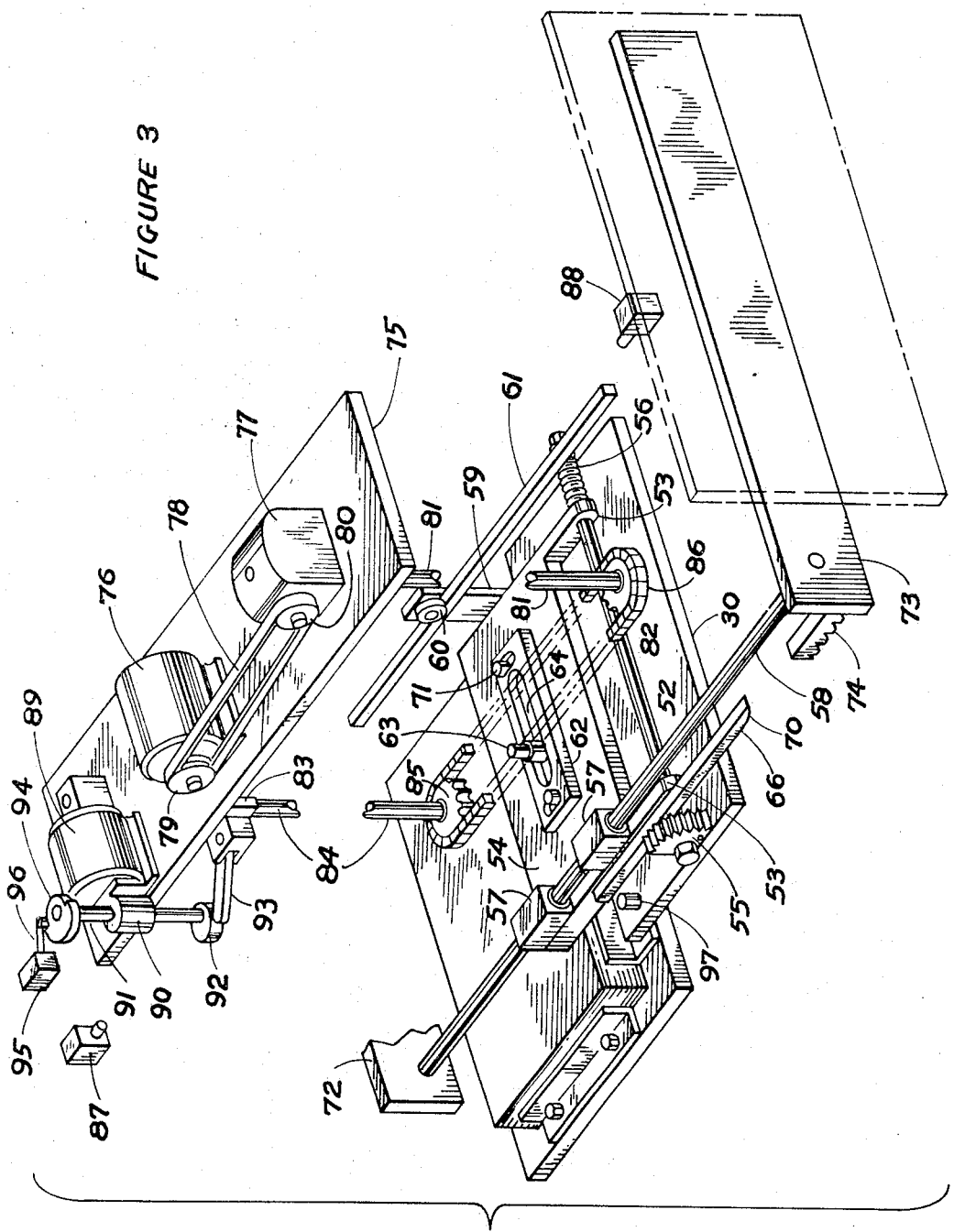
FIGURE 3 is an exploded, perspective view of the vacuum platen and of its transport mechanism, showing their relationship to the magazine for the supply of copy sheets illustrated by FIGURES 1 and 2 and to the optical image plane of the equipment in which this apparatus is used.

Referring specifically to FIGURE 3, it will be seen that the vacuum platen 30 has attached to its upper surface an axle 52, which is carried by journals 53, 53 of the carrier plate 54. The vacuum platen 30 is smaller in area than the area of the plate 34 of the copy supply magazine defined by its guide walls 35, 36, 37 and 38, and smaller in dimension that the sheet with which it is intended to carry. Thus, for example, the copy sheet may extend one inch beyond each edge of the vacuum platen when being transported thereby. In any event, the copy sheet must extend beyond the edge adjacent the guide wall 37 to permit it to be picked up by the conveyor system of the apparatus, as described hereinafter.

One end of the axle 52 carries a quarter gear 55, while the other end is loaded by the spring 56, the tension of which tends to retain the platen in its normal position in relation to the carrier plate 54. The quarter gear 55 has its lower flat face attached to the upper surface of the vacuum platen 30. This attachment of the quarter gear 55 to the vacuum platen is the sole support of the vacuum platen. The carrier plate 54 has a pair of journals 57, 57 on its upper surface, which are slideably mounted on the cylindrical guide rod 58. The guide rod 58 serves both to support one side of the carrier plate 54 and to guide it along a fixed line of travel. The other side of the carrier plate 54 is attached to the vertical plate 59, the upper end of which carries a roller 60 which is supported by the horizontal rod 61, which is parallel to the rod 58 and has a flat upper surface in a horizontal plane over which the roller 60 is free to move. The rod 61 is attached to the frame of the apparatus in a firmly-fixed position. The parallel rods 58 and 61 extend longitudinally from a position above the copy sheet supply magazine, FIGURE 1, to a position adjacent the optical image of the equipment of which this apparatus forms an assented component. The upper surface of the carrier plate 54 has affixed thereto a cross-slide plate 62 which carries a pawl 63 in a slot 64, in which the pawl 63 is free to move along a path which is at right angles to the lengths of the parallel rods 58 and 61.

Figure 4:
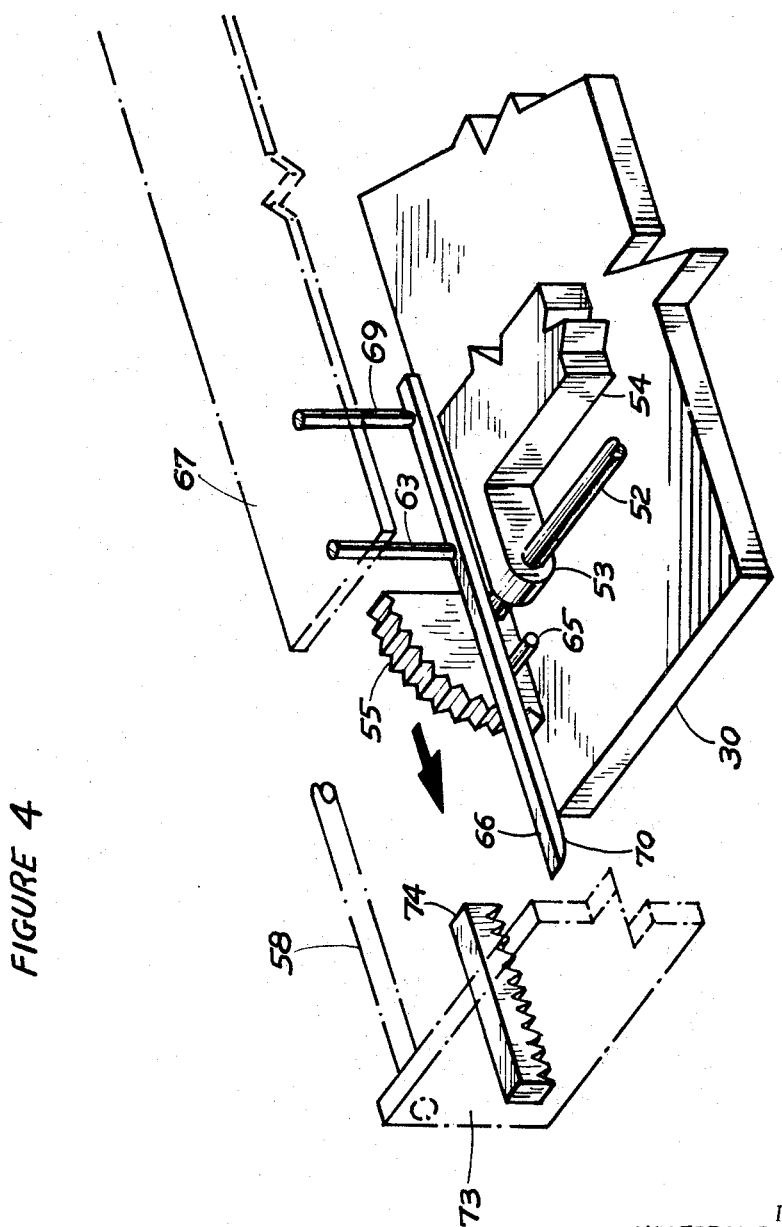
FIGURE 4 is a fragmentary perspective view of the quarter gear on the top of the vacuum platen, and of the mechanism by which the vacuum platen is held in a horizontal plane as it is passed over the corona discharge unit in a photoelectrostatic reproduction unit.

Referring specifically to FIGURE 4, it will be seen that the quarter gear 55 carries a roller 65 on its side which is laterally displaced from the center of rotation of the quarter gear 55 and the axle 52 in a forwardly direction, i.e. in a direction toward the optical image plane of the apparatus. The roller 65 rides on the lower surface of the rod 66, which is in a horizontal plane, to a position near its end section adjacent the optical image plane and is fixed in a stationary position to the frame 67 by the rods 68 and 69. End section 70 of the rod 66 is curved upwardly. The length of this rod 66 is parallel to the cylindrical guide rod 58. The contact of the roller 65 with the horizontal lower surface of the rod 66 keeps the vacuum platen from tilting with a dropping of its backwardly edge. This is one of two elements which retain the lower surface of the vacuum platen 30 in a horizontal plane during its travel to the location at which it is rotated through a ninety degree angle to bring the lower surface into an optical image plane. The second of these two elements is the set screw 71, which extends through the carrier plate 54 near its backwardly edge. The lower end of this set screw bears on the upper surface of the vacuum platen 30 is adjustable to position the lower surface of the vacuum platen 30 in a horizontal plane and, when in contact with the upper surface of the vacuum platen, prevents its forwardly edge from tilting downwardly.

The end of the guide rod 58 is attached at its backwardly end to plate 72, and at its forwardly end to the plate 73 which is in a vertical plane adjacent the optical image plane of the apparatus. The plates 72 and 73 are both rigidly attached to the frame of the apparatus. The plate 73 carries a rack 74 which extends horizontally from its surface and is positioned to engage the gear 55 as the vacuum platen is moved along the rods 58 and 61 to the proximity of the plate 73. Upon engaging the gear 55, the rack 74 causes the vacuum platen 30 to rotate through an angle of ninety degrees to place the surface of a copy sheet carried on its lower surface in the vertical optical image plane of the apparatus. As the vacuum platen 30 reaches the point at which its rotation is started, by the engagement of the rack 74 with the quarter gear 55, the roller rides upwardly along the curved section of the section 70 of the rod 66 and off of the end of that rod and, therefore, does not interfere with the rotation of the vacuum platen.

The motor plate 75 is located in a parallel plane directly above the rods 58 and 61. It is shown in an exploded position by FIGURE 3 to permit the detail of the lower parts of the unit to be shown. The motor plate 75 has an electric motor 76 and a speed reducer 77 attached to its upper surface. The electric motor 76 is adapted to drive the speed reducer 77 by the chain 78 carried by the motor sprocket 79 and the speed reducer sprocket 80. The speed reducer 77 drives a shaft 81, which extends downwardly through the plate 75 and carries the sprocket 82 on its lower end. The plate 75 carries a bearing 83 in which a second downwardly extending shaft 84 is free to rotate. The shaft 84 carries, on its lower end, the sprocket 85 which is in the same parallel plane as the sprocket 82. The shafts 81 and 84 are spaced apart along a line which parallels the rods 58 and 61.

The sprockets 82 and 85 carry a sprocket chain 86 to which the pawl 63 is attached. As the chain 86 passes around the sprockets 82 and 85, the pawl 63 moves back-and-forth in the slot 64, and moves the carrier plate 54 back-and-forth along the rods 58 and 61. The positions of the shafts 81 and 84 are such that the carrier plate 54 transports the vacuum platen 30 back-and-forth, beginning from a position in which the vacuum platen is centered above the position to which the copy sheet carrier plate 34 of the copy supply magazine rises in its action to bring the top sheet of a stack of copy sheets into contact with the platen, to a position in which the vacuum platen's lower surface has been turned into the optical image plane of the apparatus.

The limit switch 87, carried by the frame of the apparatus, is located at, and activated by, the rearwardly edge of the carrier plate 54 when the carrier plate is in its initial position, and is in a closed position when the carrier plate 54 is in that position. The limit switch 88 is located at the forwardly end of the line of travel of the carrier plate 54, and is closed by contact with the forwardly surface of the carrier plate when it comes into the optical image plane of the apparatus. As will be explained hereinafter, these limit switches form an essential part of the electrical control of the apparatus.

The motor plate 75 carries a second electric motor 89 which is provided with a speed reducer 90, and a shaft 91 which extends downwardly from the speed reducer 90, to a location below the level of the edge of the motor plate 75, and upwardly above the speed reducer. The lower end of the shaft 91 carries a cam 92 which bears on the free end of the shift arm 93, which is pivotally attached to the edge of the motor plate 75 and spring loaded so that its free end always bears on the peripheral surface of the cam 92. The free end of the shift arm 93 is moved laterally back-and-forth by the rotation of the cam 92.

The upper end of the shaft 91 carries the cam 94. The limit switch 95 is attached to the frame of the apparatus, in a position such that the end of its activating arm 96 bears on the cam 94. The periphery of the cam 94 is such that the limit switch 95 is tripped each half-rotation of the cam at the point of rotation of the shaft 91 at which the shift arm 93 is in its fully-extended position, and then at which the shift arm is in its position of rest. As will be fully explained hereinafter, the limit switch 95 is an essential component of the electrical system of the apparatus which controls and times the operation of the cam motor 89 and the movement of the shift arm 93.

After the vacuum platen 30 has been moved into the optical image plane of the apparatus and started its return from that position, the cam 92 under the control of the electrical control system of the apparatus moves the free end of the shift arm 93 outwardly, and places its outer edge in a diagonal position across the line of travel of the platen 30 as the carrier plate 54 returns to its original position. The vacuum platen 30 carries, on its upper surface, a shift roller 97 which is located in a position such that it engages the diagonal surface of the shift arm 93, as the vacuum platen 30 is moved toward its initial position, and causes the vacuum platen to move laterally against the tension of the spring 56 around its shaft 52, and to be in its fully-displaced position when the carrier plate 54 reaches its initial position.

This lateral displacement of the vacuum platen 30 places the edge of a sheet which it carries in position to be grasped by a gripper of a second transport system of the equipment. At the instant that a gripper of the second transport mechanism of the equipment grasps a copy sheet carried by the vacuum platen, the vacuum supplied to the vacuum platen is shut off by the action of the solenoid switch 31, shown by FIGURE 1. After a sheet has been removed from the surface of the vacuum platen by a gripper of the second transport system of the apparatus, the cam 92 is rotated under the action of the electrical control system of the apparatus to cause the shift arm 93 to move inwardly, permitting the vacuum platen to move laterally under the action of the spring 56 to its normal initial position over the copy supply magazine of the apparatus. The vacuum platen 30 is then in position to receive another copy sheet from the copy sheet supply magazine.

Figure 6:
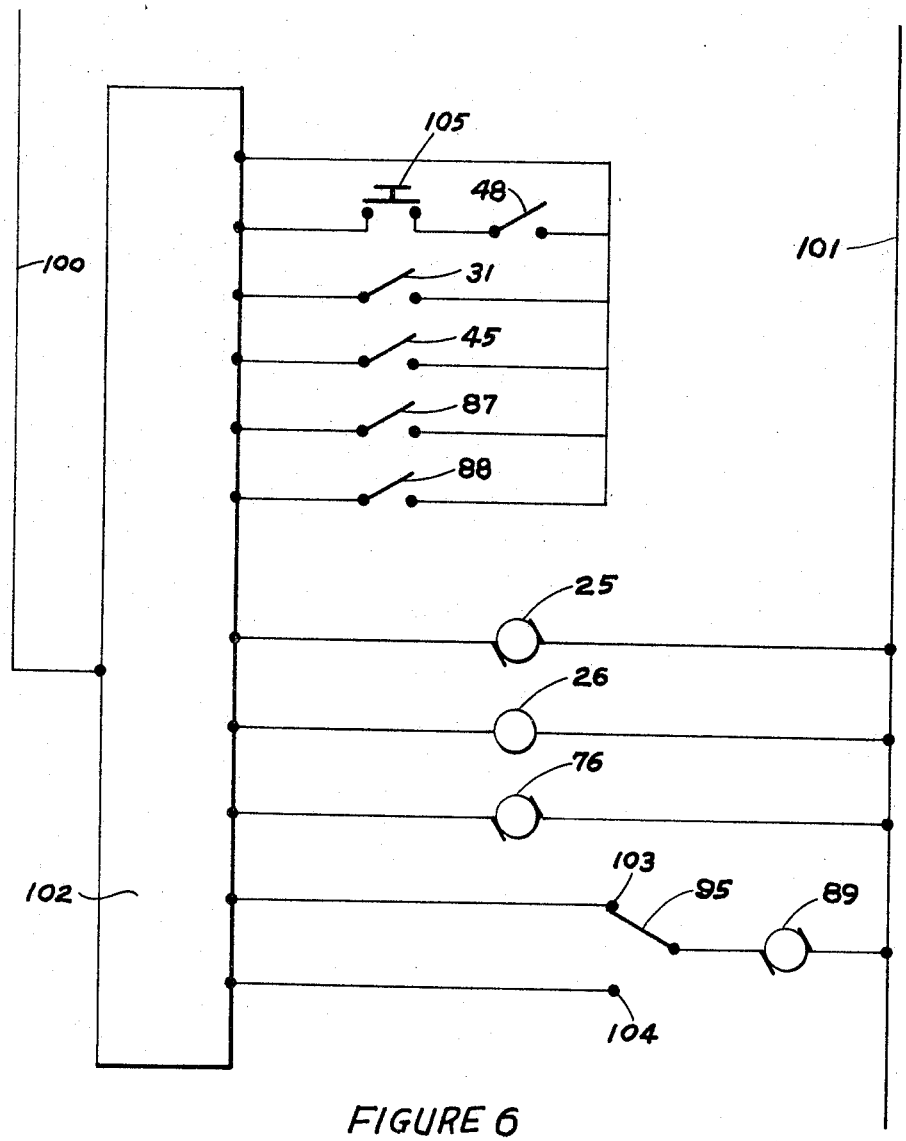
FIGURE 6 is an electrical wiring diagram of the electrical circuits for the operation of the apparatus.

The electrical wiring diagram shown by FIGURE 6 is schematic in that it does not show details of the automatic control circuits which are fully illustrated and described in our copending application Ser. No. 189,758, filed Apr. 24, 1962, to which reference has been made hereinbefore. Referring specifically to FIGURE 6, it will be seen that the mechanism of this invention is connected to a suitable source of alternating electrical current which may be, for example, a 60-volt supply by the lines 100 and 101. As illustrated, the line 100 is connected to a terminal of the automatic control circuits which are designated generally by the numeral 102.

The other side of the alternating electrical current through the line 101 is connected to one terminal each of the motor of the vacuum pump 25, the solenoid valve 26, the electric motor 76 and the electric motor 89. The second terminals of the motor of the vacuum pump 25, the solenoid valve 26 and the electric motor 76 are connected directly to the automatic control circuits designated generally by the numeral 102. The second terminal of the motor 89 is connected to one terminal of the switch 95, which has two alternative terminals 103 asd 104 connected to the automatic control circuits 102.

The starting switch 105 for this apparatus and the limit switch 48 are connected in series with the automatic control circuits 102. The limit switch 48 is in its closed position when the copy sheet supply magazine is in its initial operating position and as noted hereinbefore, the mechanism cannot operate when this switch is open. The closing of the starting switch 105 when the limit switch 48 is in closed position.

When both of the switches 105 and 48 are closed, the automatic control circuits of the apparatus activates the vacuum pump 25 of the apparatus causing it to draw air from the vacuum platen 30 and furnish air under pressure to the air cylinder 20 which raises the carrier plate 34 to bring a copy sheet into contact with the vacuum platen 30.

Upon contact between a copy sheet and the vacuum platen 30, the air pressure in the cylinder 20 is released, permitting the carrier plate 34 to drop to its initial position of rest. Upon dropping to its rest position, the carrier plate 34 closes the limit switch 45, activating the transport motor 76 to move the vacuum platen 30 forwardly over a corona discharge unit to a terminal position in which it is rotated through an angle of ninety degrees to place the copy sheet in the focal plane of an optical system adapted to transmit an optical image to the surface of the sheet.

Upon arriving at a vertical position in the focal plane of the optical system of the equipment, the limit switch 88 is closed by the forwardly travel of the carrier plate 54. This closing of the limit switch 88 stops the operation of the electric motor 76 to permit the vacuum platen 30 to remain at rest in a vertical position for a brief interval of time while the copy sheet is exposed to an optical image. At the end of the exposure period, the automatic control circuits 102 of the apparatus reactivates the motor 76 to move the vacuum platen on its backwardly path of travel. The control circuits 102 have now turned off the corona discharge, but are continuing the operation of the vacuum pump 25.

As the vacuum platen moves backwardly to its initial position of rest under the action of the automatic control circuits 102 of the apparatus, those control circuits also activate the cam motor 89 to cause it to close the switch 95 which keeps the motor 89 in operation until the shift arm 93 is moved outwardly to bear on the shift roller 97 forcing the vacuum platen 30 to move to a laterally shifted position as it is moved backwardly by the transport motor 76. When the shift arm 93 reaches its laterally extended position, the switch 95 is reversed causing the automatic control circuit to stop the cam motor 89. The lateral displacement of the vacuum platen 30 places a laterally extending edge of the copy sheet now carrying an electrostatic image to be picked up by a cooperating mechanism for further automatic processing.

Upon reaching its backwardly position in its laterally shifted position, the vacuum platen carrier plate 54 closes the limit switch 87, stops the transport motor 76 by the action of the automatic control circuits 102 and at the same time de-energizes the motor of vacuum pump 25. The resulting lateral displacement of the vacuum platen 30 and the simultaneous release of the vacuum hold the copy sheet on the vacuum platen, places the sheet in a position to be picked up by another transport mechanism for further processing.

After the exposed copy sheet is removed from the vacuum platen, the automatic control circuit starts the cam motor 89 causing both a reversal of the switch 95 which keeps the motor 89 in operation until the shift arm 93 is withdrawn to its retracted position. The retraction of the shift arm 93 which has been holding the vacuum platen 30 in a laterally displaced position permits the platen to return to its original operating position by the action of the spring 224. At this point the apparatus is in condition for another cycle of operation.

In this specification, many details and specific illustrations have been given concerning the apparatus of this invention. It will be readily apparent to those skilled in the art that many variations can be made in the details of the apparatus without departing from the spirit of the invention or the scope of the claims which follow.

We claim:

1. In apparatus for the reproduction of original copy, the combination of a copy sheet supply magazine and a vacuum platen adapted to pick up a copy sheet and to place it in an optical image plane, which comprises;
- a vacuum platen having a plane lower surface, an interior chamber, and a plurality of perforations extending from its lower surface into the said interior chamber;
- a transport means for moving the vacuum platen in a horizontal plane;
- a vacuum pump;
- a flexible conduit connecting the vacuum side of the said vacuum pump to the interior chamber of the vacuum platen;
- a copy sheet supply magazine positioned beneath the initial position of rest of the vacuum platen, comprising an upper plate adapted to carry on its upper surface a stack of copy sheet, a mechanical means for raising the said plate to bring the upper sheet of the said stack into contact with the lower surface of the said vacuum platen, and an air cylinder having its piston mechanically connected to the said means to supply force for raising the said plate, which brings the top sheet of a stack of copy sheets into contact with the vacuum platen with a force which remains constant with variations in the height of the stack of copy sheets, and then permitting the upper plate to drop back to its position of rest;
- and a conduit connecting the pressure side of the said vacuum pump to the pressure side of the said air cylinder.

2. In apparatus for the reproduction of original copy, the combination of a copy sheet supply magazine and a vacuum platen adapted to pick up a copy sheet and to place it in an optical image plane, which comprises;
- a vacuum platen having a plane lower surface, an interior chamber, and a plurality of perforations extending from its lower surface into the said interior chamber;
- a transport means for moving the vacuum platen in a horizontal plane;
- a vacuum pump;
- a flexible conduit connecting the vacuum side of the said vacuum pump to the interior chamber of the vacuum platen;
- a copy sheet supply magazine positioned beneath the initial position of rest of the vacuum platen, comprising an upper plate adapted to carry on its upper surface a stack of copy sheets, a mechanical means for raising the said plate to bring the upper sheet of the said stack into contact with the lower surface of the said vacuum platen, and an air cylinder having its piston mechanically connected to the said means to supply force for raising the said plate, which brings the top sheet of a stack of copy sheets into contact with the vacuum platen with a force which remains constant with variations in the height of the stack of copy sheets, when its pressure side is supplied with compressed air, and a throttling valve which controls the intake of air to the atmospheric-pressure side of the air cylinder, by which the rate at which the upper plate drops under the force of gravity is controlled, after the air pressure on the pressure side of the air cylinder is released;
- and a conduit connecting the pressure side of the said vacuum pump to the pressure side of the said air cylinder.

3. In apparatus for the reproduction of original copy, the combination of a copy sheet supply magazine and a vacuum platen adapted to pick up a copy sheet and to place it in an optical image plane, which comprises;
- a vacuum platen having a plane lower surface, an interior chamber, and a plurality of perforations extending from its lower surface into the said interior chamber;
- a transport means for moving the vacuum platen in a horizontal plane;
- a vacuum pump;
- a flexible conduit connecting the vacuum side of the said vacuum pump to the interior chamber of the vacuum platen;
- a pressure-sensitive, solenoid valve in the said vacuum conduit, and an associated electrical control system which permits the said transport means to move the said vacuum platen only when the vacuum platen carries a vacuum, as a result of the sealing of the perforations on its lower surface by a copy sheet thereon;
- a copy sheet supply magazine positioned beneath the initial position of rest of the vacuum platen, comprising an upper plate adapted to carry on its upper surface a stack of copy sheets, a mechanical means for raising the said plate to bring the upper sheet of the said stack into contact with the lower surface of the said vacuum platen, and an air cylinder having its piston mechanically connected to the said means to supply force for raising the said plate, which brings the top sheet of a stack of copy sheets into contact with the vacuum platen with a force which remains constant with variations in the height of the stack of copy sheets, and then permitting the upper plate to drop back to its position of rest;
- a conduit connecting the pressure side of the said vacuum pump to the pressure side of the said air cylinder;
- and a solenoid valve in the said pressure conduit which, when opened, permits air to escape from the said conduit and from the pressure side of the said air cylinder, to permit the upper plate of the copy sheet supply magazine to drop to its position of rest under the force of gravity.

4. In apparatus for the reproduction of original copy, the combination of a copy sheet supply magazine and a vacuum platen adapted to pick up a copy sheet and place it in an optical image plane, which comprises;
- a vacuum platen having a plane lower surface, an interior chamber, a plurality of perforations extending from its lower surface into the said interior chamber, and a flexible conduit connecting the said interior chamber with a source of vacuum;
- a means for moving the vacuum platen in a horizontal plane;
- a copy sheet supply magazine positioned beneath the initial position of rest of the vacuum platen, comprising an upper plate adapted to carry on its upper surface a stack of copy sheets, and a means for raising the said plate to bring the upper sheet of the said stack into contact with the lower surface of the said vacuum platen, which copy sheet supply mechanism comprises;
    - four toggle arms which are attached in pairs at the ends of a pair of axles, with a section extending upwardly at an angle, and at least three of which each have a section extending downwardly;
    - a connecting rod, connected by swivel joints to the lower ends of a toggle arm of each of the said pairs;
    - an air cylinder having its piston rod connected by a swivel joint to the lower end of a toggle arm on the opposite end of an axle which carries one of the toggle arms, the lower end of which is connected by the said connecting rod, the said air cylinder, upon being supplied with compressed air, being adapted to move the lower end of the toggle arm to which it is connected and, thereby, cause the upper ends of the four toggle arms to move in synchronism in an upwardly-arcuate path, and to move along the reverse path of travel when the air cylinder is relieved of its supply of compressed air;

a plate adapted to retain on its upper surface a stack of copy sheets carried by the upper ends of the said toggle arms, which moves upwardly along a vertical path when the upper ends of the said toggle arms are forced by the action of the compressed air cylinder to move along the said upwardly-arcuate path of travel, and to drop downwardly along a vertical path when the upper ends of the toggle arms move along the reverse arcuate path of travel.

5. In apparatus for the reproduction of original copy, the combination of a copy sheet supply magazine and a vacuum platen adapted to pick up a copy sheet and place it in an optical image plane, which comprises;

a vacuum platen having a plane lower surface, an interior chamber,
a plurality of perforations extending from its lower surface into the said interior chamber, and a flexible conduit connecting the said interior chamber with a source of vacuum;
a means for moving the vacuum platen in a horizontal plane;
a copy sheet supply magazine positioned beneath the initial position of rest of the vacuum platen, comprising an upper plate adapted to carry on its upper surface a stack of copy sheets, and a means for raising the said plate to bring the upper sheet of the said stack into contact with the lower surface of the said vacuum platen, which copy sheet supply mechanism comprises;
　a compressed air cylinder;
　four toggle arms mechanically attached to the piston of the compressed air cylinder, the upper ends of which are moved in an upwardly-arcuate path when the compressed air cylinder is supplied with compressed air, and along the reverse path of travel when the air cylinder is relieved of its supply of compressed air;
　an upper plate carried by the upper ends of said toggle arms, which is adapted to retain on its upper surface a stack of copy sheets;
　a pair of telescoping arms, each of which has at least two sections, the inner sections of which are attached to a rigid support, and the outer sections of which are in contact with the lower surface of the said upper plate when the plate is in its lowered position, and are attached together near their inner ends by a horizontal plate, which has two upwardly-extending rods affixed to its upper surface and spaced apart on that surface;
　and a pair of bars attached to the lower surface of the upper plate which extend beyond the inner edge of the said plate, and carry perforations which are adapted to receive the said upwardly-extending rods with a sliding fit, which permits the upper plate to move upwardly from the said telescoping arms and downwardly to come to rest on them;
　the said telescoping arms being adapted, upon being extended, to carry the upper plate outwardly from a position above the said toggle arms while being guided by the said upwardly-extending rods.

6. An apparatus for the reproduction of original copy, the combination of a copy sheet supply magazine and a vacuum platen adapted to pick up a copy sheet and place it in an optical image plane, which comprises;

a vacuum platen having a plane lower surface, an interior chamber, a plurality of perforations extending from its lower surface into the said interior chamber, and a flexible conduit connecting the said interior chamber with a source of vacuum;
a means for removing the vacuum platen in a horizontal plane;
a copy sheet suply magazine positioned beneath the initial position of rest of the vacuum platen, comprising an upper plate adapted to carry on its upper surface a stack of copy sheets, and a means for raising the said plate to bring the upper sheet of the said stack into contact with the lower surface of the said vacuum platen, which copy sheet supply mechanism comprises;
　a compressed air cylinder;
　four toggle arms mechanically attached to the piston of the compressed air cylinder, the upper ends of which are moved in an upwardly-arcuate path when the compressed air cylinder is supplied with compressed air, and along the reverse path of travel when the air cylinder is relieved of its supply of compressed air;
　an upper plate carried by the upper ends of said toggle arms, which is adapted to retain on its upper surface a stack of copy sheets;
　a pair of telescoping arms, each of which has at least two sections, the inner sections of which are attached to a rigid support, and the outer sections of which are in contact with the lower surface of the said upper plate when the plate is in its lowered position, and are attached together near their inner ends by a horizontal plate, which has two upwardly-extending rods affixed to its upper surface and spaced apart on that surface;
　a pair of bars attached to the lower surface of the upper plate which extend beyond the inner edge of the said plate, and carry perforations which are adapted to receive the said upwardly-extending rods with a sliding fit, which permits the upper plate to move upwardly from the said telescoping arms and downwardly to come to rest on them;
　the said telescoping arms being adapted, upon being extended, to carry the upper plate outwardly from a position above the said toggle arms while being guided by the said upwardly-extending rods;
　a limit switch positioned adjacent the position of the inner edge of the upper plate when in its operating position, which is held in a closed position when the upper plate is in that position, which opens when the plate is moved outwardly by the extension of the telescoping arms, and which prevents the operation of the said air cylinder when in open position;
　and a second limit switch positioned adjacent the lower surface of the upper plate, in a location to be held closed by the plate when it is in its lowered position, and to be opened when the plate is raised by the action of the said air cylinder which, when in open position, prevents the operation of the means for moving the vacuum platen in a horizontal plane.

7. In an apparatus for the reproduction of original copy, a vacuum platen and an associated transport mechanism which is adapted to pick up a copy sheet from a stack of such sheets, carry the said sheet in a horizontal plane, position the surface of the said sheet in a vertical plane, and then return the sheet to a position laterally displaced from the location in which it was originally picked up from which the sheet can be removed for further processing, which comprises in combination;

a vacuum platen having a flat, lower working surface, an interior chamber, a plurality of perforations extending from its lower surface into the said interior chamber, and a flexible conduit connecting the said interior chamber with a source of vacuum;

a pair of parallel carrier rods positioned in a horizontal plane;

a carrier plate, slideably mounted on one of the said rods and supported by a roller on the upper surface of the other of said rods;

an axle attached to the said vacuum platen positioned transversely of the said carrier rods, and slideably mounted on the lower side of the carrier plate;

a gear attached to one end of the said axle;

a rack positioned adjacent the end section of one of the said carrier rods, opposite the ends of the rod adjacent the initial position of the said vacuum platen, and adapted to engage the said gear as the carrier plate is moved toward that end of the carrier rod, to cause the vacuum platen to rotate through an angle of ninety degrees to place its working face in a vertical plane facing away from the remainder of the said combination;

a combination of means which retain the vacuum platen in a position in which its lower and working surface is in a horizontal plane prior to the engagement of the said gear with the said rack, and which do not interfere with the rotation of the said platen through an angle of ninety degrees to place its working surface in a vertical plane;

and means for causing the said carrier plate to move back-and-forth along the said carrier rods.

8. In apparatus for the reproduction of original copy, a vacuum platen and an associated transport mechanism which is adapted to pick up a copy sheet from a stack of such sheets, carry the said sheet in a horizontal plane, position the said sheet in a vertical plane, and then return the sheet to a position laterally displaced from the position in which it was originally picked up from which the sheet can be removed for further processing, which comprises in combination;

a vacuum platen having a flat, lower working surface, an interior chamber, a plurality of perforations extending from its lower surface into the said interior chamber, and a flexible conduit connecting the said interior chamber to a source of vacuum;

a pair of parallel carrier rods positioned in a horizontal plane;

a carrier plate, slideably mounted on one of the said rods and supported by a roller on the upper surface of the other of the said rods;

an axle attached to the said vacuum platen, positioned transversely of the said carrier rods, and slideably mounted on the lower side of the carrier plate;

a gear attached to one end of the said axle;

a rack positioned adjacent the end section of one of the said carrier rods, opposite the end of the rod adjacent the initial position of the said vacuum platen, and adapted to engage the said gear as the carrier plate is moved toward that end of the carrier rod, to cause the vacuum platen to rotate through an angle of ninety degrees to place its working face in a vertical plane facing away from the said combination;

a combination of means to retain the vacuum platen in a position in which its lower and working face is in a horizontal plane prior to the engagement of the said gear with the said rack, and which do not interfere with the rotation of the said platen through an angle of ninety degrees to place its working surface in a vertical plane;

a horizontal motor plate positioned above the said carrier rods;

an electric motor and a reducing gear connected thereto, and positioned on the said motor plate;

a vertical drive shaft attached to the said reducing gear, extending downwardly through the said plate, and carrying a sprocket on its lower ends;

a second vertical shaft mounted on the bottom of the said motor plate, and spaced away from the first said vertical shaft along a line parallel to the said carrier rods;

an idler sprocket mounted on the lower end of said second vertical shaft;

a continuous sprocket chain passing around and carried by the said sprockets;

a cross-slide plate on the top of the said carrier plate carrying a pawl, which is free to slide back-and-forth along at right angles to the length of the said carrier rods, and is attached to the outside of the sprocket the carrier plate is moved, first in one direction and then in the other direction, along the said slide rods.

9. In apparatus for the reproduction of original copy, the combination of a vacuum platen and an associated transport mechanism described by claim 8, in which the transport mechanism includes the combination of;

a limit switch which is positioned to be closed by contact with the vacuum platen carrier plate, when the working face of the vacuum platen has been placed in a vertical plane;

an automatic, electrical-control system, including an electric timer connected to the said limit switch and to the electric motor which moves the vacuum platen back-and-forth which, upon activation by the closing of the said limit switch, stops the said electric motor and causes the vacuum platen to stop its movement with its working face in the vertical plane, to retain the vacuum platen in that position for a preset period of time controlled by the electric timer, and then to start the electric motor to move the vacuum platen's working face out of the said vertical plane and in a backwardly direction toward its initial position;

and a second limit switch, which is positioned to be closed by contact with the vacuum platen carrier plate when it reaches its original and backwardly position, and connected to said automatic control system which, upon being closed, stops the said electric motor and the movement of the vacuum platen, and stops vacuum to the vacuum platen.

10. In apparatus for the reproduction of original copy, a vacuum platen and an associated transport mechanism which is adapted ot pick up a copy sheet from a stack of such sheets, carry the said sheet in a horizontal plane, position the said sheet in a vertical plane, and then return the sheet to a position laterally displaced from the position in which it was originally picked up from which the sheet can be removed for further processing, which comprises in combination;

a vacuum platen having a flat, lower working surface, an interior chamber, a plurality of perforations extending from its lower surface into the said interior chamber, and a flexible conduit connecting the said interior chamber to a source of vacuum;

a pair of parallel carrier rods, positioned in a horizontal plane;

a carrier plate, slideably mounted on one of the said rods and supported by a roller on the upper surface of the other of the said rods;

an axle attached to the said vacuum platen, positioned transversely of the said carrier rods, and slideably mounted on the lower side of the carrier plate;

a gear attached to one end of the said axle;

a rack positioned adjacent the end section of one of the said carrier rods, opposite the end of the rod adjacent the initial position of the said vacuum platen, and adapted to engage the said gear as the carrier plate is moved toward that end of the carrier rod, to cause the vacuum platen to rotate through an angle of ninety degrees to place its working face in a vertical plane facing away from the remainder of the said combination;

a combination of means to retain the vacuum platen in a position in which its lower and working face is in a horizontal plane prior to the engagement of the said gear with the said rack, and which do not interfere with the rotation of the said platen through an angle of ninety degrees to place its working face in a vertical plane;

a coil spring mounted on the said axle, and attached thereto so that its tension is directed to holding the axle in its normal position with respect to the said carrier plate;

a horizontal motor plate;

a shift roller extending upwardly from the top of the said carrier plate;

means carried by said motor plate including an electric motor which is adapted to move the said carrier plate back-and-forth along the said carrier rods;

a second electric motor mounted on the said motor plate, which is connected to a vertical shaft which extends downwardly below the said motor plate;

a cam on the said shaft;

and a shift arm attached to the motor plate by a hinge at one end, and bearing on the said cam so that its free end is moved away from the edge of the plate by the rotation of the cam to bear on the said shift roller as the carrier plate is moved toward its initial position, to cause the said carrier plate to move in a direction at right angles to the length of the said carrier rods, against the tension of the coil spring around the axle of the vacuum platen.

11. In apparatus for the reproduction of original copy, the combination of a vacuum platen and an associated transport mechanism described by claim 10, in which the transport mechanism includes the combination of:

a second cam on the vertical shaft of the second electric motor carried by the said motor plate;

a limit switch positioned adjacent the said cam, having its trip arm bearing on the peripheral surface of the said cam;

and an automatic, electrical-control system connected to the said limit switch;

the said cam having a peripheral surface shaped to trip the said limit switch when the first cam on the shaft has moved the shift arm to its laterally-extended position, stopping the said second electric motor, and leaving the shift arm in its fully-extended position.

References Cited

UNITED STATES PATENTS

| | | | |
|---|---|---|---|
| 2,942,877 | 6/1960 | Fowlie | 271—31 |
| 2,999,686 | 9/1961 | Cheeseman | 271—26 X |
| 3,025,052 | 3/1962 | Gutteling | 271—28 |

M. HENSON WOOD, JR., *Primary Examiner.*

R. A. SCHACHER, *Assistant Examiner.*